United States Patent [19]

Nakao et al.

[11] Patent Number: 4,474,074
[45] Date of Patent: Oct. 2, 1984

[54] TRANSMISSION WITH AN APPARATUS FOR PREVENTING A REVERSE GEAR FROM DISENGAGING FROM THE MESHED POSITION

[75] Inventors: Fumie Nakao; Nobuaki Katayama; Shyogo Kato; Takashi Yamamoto, all of Toyota, Japan

[73] Assignee: Toyota Jidosha Kogyo Kabushiki Kaisha, Aichi, Japan

[21] Appl. No.: 295,517

[22] Filed: Aug. 24, 1981

[30] Foreign Application Priority Data

Oct. 28, 1980 [JP] Japan .................. 55-150064

[51] Int. Cl.³ .................. F16H 55/06; F16H 1/12; F16H 57/00
[52] U.S. Cl. .................. 74/462; 74/421 R; 74/410
[58] Field of Search ............ 74/462, 410, 460, 421 R, 74/421 A, 341, 342

[56] References Cited

U.S. PATENT DOCUMENTS

| | | | |
|---|---|---|---|
| 1,390,414 | 9/1921 | Wingquist | 74/462 |
| 1,820,246 | 8/1931 | Preis et al. | 74/462 |
| 3,043,158 | 7/1962 | Herr, Jr. | 74/462 |
| 3,552,226 | 1/1971 | Roth | 74/457 |
| 3,881,365 | 5/1975 | Hardy | 74/462 |
| 3,918,560 | 11/1975 | Zach, Jr. | 74/462 X |

FOREIGN PATENT DOCUMENTS

| | | |
|---|---|---|
| 1450863 | 3/1969 | Fed. Rep. of Germany . |
| 521076 | 7/1921 | France .................. 74/460 |
| 473336 | 7/1969 | Switzerland . |
| 561714 | 6/1944 | United Kingdom .......... 74/462 |
| 1195718 | 6/1970 | United Kingdom . |
| 1227075 | 3/1971 | United Kingdom . |
| 2004972 | 4/1979 | United Kingdom . |
| 2028939 | 3/1980 | United Kingdom .......... 74/462 |

Primary Examiner—Allan D. Herrmann
Assistant Examiner—Stephen B. Andrews
Attorney, Agent, or Firm—Parkhurst & Oliff

[57] ABSTRACT

In a transmission which comprises a reverse gear secured to a main shaft, a counter reverse gear secured to a counter shaft, and an axially movable reverse idler gear arranged between the reverse gear and the counter gear to mesh with them in order to establish and break the connection between the reverse gear and the counter gear, the reverse idler gear being provided, on its tooth surface corresponding to the counter reverse gear, with a tapered tooth trace having a tapered angle $\beta$ which is larger than a tapered angle $\alpha$ of a tapered tooth trace on the tooth surface of the counter reverse gear that meshes with the reverse idler gear.

2 Claims, 8 Drawing Figures

TRANSMISSION WITH AN APPARATUS FOR PREVENTING A REVERSE GEAR FROM DISENGAGING FROM THE MESHED POSITION

This invention generally relates to a transmission of a motor vehicle which comprises a reverse idler gear arranged between a reverse gear and a counter reverse gear to shift a gear selection to a reverse gear position, and particularly to an apparatus for preventing the reverse gear from disengaging from the meshed portion.

Gear engagements between the reverse gear, the counter reverse gear and the reverse idler gear in the above mentioned type of transmission are typically illustrated in FIGS. 1 and 2. In FIGS. 1 and 2, a reverse idler gear 25 is provided between a reverse gear 9 secured to a main shaft 11 and a counter reverse gear 21 secured to a counter shaft 15. The reverse idler gear 25 is slidably supported on an idler shaft 23 in the axial direction of the latter, so that the axial movement of the reverse idler gear 25 by the axial movement of a shift fork 28 engaging the reverse idler gear 25 causes the gear engagement between the reverse gear 9 and the counter reverse gear 21 to be established and broken. That is, the gear shift in a reverse gear position can be effected by the axial displacement of the reverse idler gear 25. It is noted that the front and rear sides of the vehicle correspond to the right and left hand sides in FIG. 2, respectively.

In the above mentioned type of meshing gears, in order to prevent the reverse idler gear 25 from disengaging from the meshed position with the reverse gear 9 and/or the counter reverse gear 21, the tooth traces of the these three gears are usually slightly tapered to provide the thrust (i.e. axial force) therebetween, as in the gear meshing of helical gears. The tapered tooth traces produce the thrust force applied to the reverse idler gear in the right hand direction in FIG. 2, so that the reverse idler gear, which otherwise tends to move in the left hand direction in FIG. 2, can be prevented from being accidentally disengaged from the reverse gear and the counter reverse gear.

The discussion will now be directed to the tapered tooth trace, with reference to FIGS. 3 and 4. As can be seen in FIGS. 3 and 4, the tapered angle $\gamma$ on the tooth surface 9a of the reverse gear 9 meshes with the tapered angle $\beta'$ of the tooth surface 25a of the reverse idler gear 25 and the tapered angle $\alpha$ of the tooth surface 21a of the counter reverse gear 21 meshes with the tapered angle $\beta$ of the tooth surface 25b of the reverse idler gear 25. The tapered angle of the tooth trace on the tooth surface 9b of the reverse gear 9, that is opposed to the tooth surface 9a thereof, and the tapered angle of the tooth trace on the tooth surface 21b of the counter reverse gear, that is opposed to the tooth surface 21a thereof, are designated by $\gamma'$ and $\alpha'$, respectively. FIG. 4 shows an exploded plan view of the three gears when they are taken along a plane which includes the tooth traces of the gears.

In the prior art, the tapered angles are designed to be identical to each other; $\alpha = \alpha' = \beta = \beta' = \gamma = \gamma'$. However, it is impossible, or next to impossible, to obtain completely identical tapered angles and, accordingly, they are inevitably and slightly different from each other due to possible manufacturing errors. The thrust which causes the reverse idler gear to be axially displaced, so that it is disengaged from the reverse gear and the counter reverse gear, is produced under a certain combination of the tapered angles including errors. That is, when the relationship between the tapered angles is, for example, as shown in FIG. 5, in which $\gamma$ (FIG. 4) is smaller than a design value (predetermined value) and $\alpha$ (FIG. 4) is larger than a designed value (predetermined value), the tooth surfaces which are to be meshed are not flush with each other, so that the reverse idler gear 25 is inclined at $\theta$ (FIG. 6) with respect to the idler shaft 23 due to the forces F. Since there is a slight clearance between the reverse idler gear 25 and the idler shaft 23 on which the reverse idler gear 25 is slide-fitted, the reverse idler gear can be inclined with respect to the idler shaft due to the presence of such a clearance. Consequently, when the reverse idler gear thus inclined rotates, it gradually shifts in the left hand direction in FIG. 5.

Supposing that the initial position of the tooth trace of the reverse idler gear, which meshes, at its one tooth, with the counter reverse gear 21, is designated at $15b_1$ (FIG. 6), the tooth trace comes to its final position $25b_2$ at which the one tooth of the reverse idler gear is disengaged from the counter reverse gear 21, in spite of the fact that the reverse idler gear 25 is inclined, since the latter rotates about the rotational axis 32A of the idler shaft 23. However, since the reverse idler gear 25 itself has a center axis 25A, which is inclined at $\theta$ with respect to the rotational axis 23A, the tooth trace should come to its final position $25b_3$, which is axially shifted through $\Delta l$ from the theoretical final position $25b_2$, after the reverse idler gear 25 rotates about the center axis 25A. Thus, the reverse idler gear is axially displaced through $\Delta l$ in the left hand direction, every one rotation thereof, and finally disengaged from the meshed position with the counter reverse gear.

The above discussion is mainly directed to the gear engagement of the reverse idler gear with the counter reverse gear, but can also apply to the gear engagement of the reverse idler gear with the reverse gear.

The object of the present invention is, therefore, to prevent the reverse idler gear from being disengaged from the corresponding gears meshing with the reverse idler gear.

Figure 3:
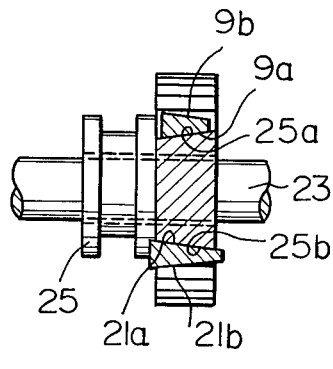
FIG. 3 is a sectional view taken along the line III—III in FIG. 1.
Figure 4:
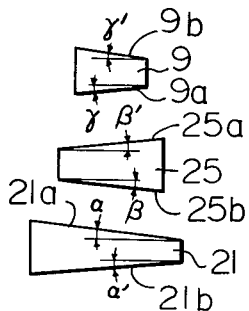
FIG. 4 is a schematic plan view of the exploded meshing gears shown in FIG. 3, which have tapered tooth traces.
Figure 6:
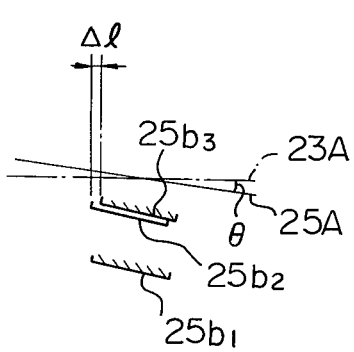
FIG. 6 is a schematic view illustrating axial displacement of the reverse idler gear.
Figure 7:
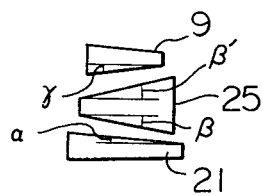
FIG. 7 is a view similar to FIG. 4 but with meshing gears having tapered tooth traces, according to the present invention.

According to the present invention, as shown in FIG. 7, the tapered angle $\beta$ of the tooth trace of the tooth surface 25b of the reverse idler gear 25 that meshes with the counter reverse gear 21 is larger than the tapered angle $\alpha$ of the tooth trace of the corresponding counter reverse gear 21 ($\beta > \alpha$), and the tooth trace tapered angle $\beta'$ of the tooth surface 25a (FIG. 4) of the reverse idler gear 25 that meshes with the reverse gear 9 is equal to or larger than the tooth trace tapered angle $\beta$ of the tooth surfaces 9a (FIG. 4) of the corresponding reverse gear 9 ($\beta' \geq \gamma$). The tooth trace angles thus set ensure that the teeth of the reverse idler gear mesh with the corresponding teeth of the reverse gear and of the counter reverse gear always at the front side (i.e. right end in FIG. 3) of the reverse idler gear 25, so that the latter cannot be inclined during operation. Therefore, even when the tapered angles are slightly different from their intended values, i.e. predetermined values, due to manufacturing errors, the relationship $\beta > \alpha$ can be maintained, and, accordingly, the reverse idler gear 25 comes into contact with the counter reverse gear 21 always at their front ends. It should be noted that the difference $(\beta - \alpha)$ between the values $\beta$ and $\alpha$ is such that the difference is always positive and does not become negative. It was experimentally confirmed that the reverse idler gear was not inclined with respect to the idler shaft and that the reverse idler gear was not accidentally displaced in the axial direction. In the experiments, the tapered angles were as follows:

$\beta > \alpha$ and $\beta' > \gamma (\beta = \beta')$.

Figure 5:
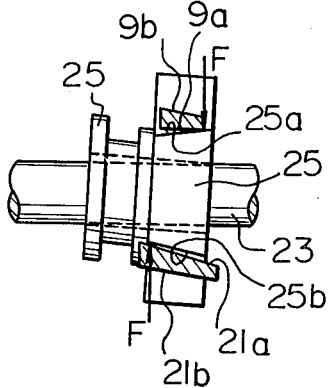
FIG. 5 is a view similar to FIG. 3 but with an inclined reverse idler gear.
Figure 8:
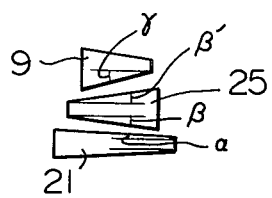
FIG. 8 is a view illustrating a variant of FIG. 7.

FIG. 8 shows another embodiment of the present invention, in which $\beta > \alpha$ and $\beta' < \gamma$. In this embodiment, the reverse idler gear 25 comes into contact with the counter reverse gear 21 always at their front ends (i.e. right ends in FIG. 8), like FIG. 7. On the other hand, in FIG. 8, the reverse idler gear 25 comes into contact with the reverse gear 9 always at their rear ends (i.e. left ends in FIG. 8), unlike FIG. 7. Therefore, in the embodiment illustrated in FIG. 8, the reverse idler gear 25 is inclined in a direction opposite to the direction in FIG. 5, so that the reverse idler gear 25 is subject to the thrust, i.e. the axial force, in a direction opposite to the direction in FIG. 5. That is, the reverse idler gear 25 is pushed in a righthand direction in FIG. 3.

Figure 1:
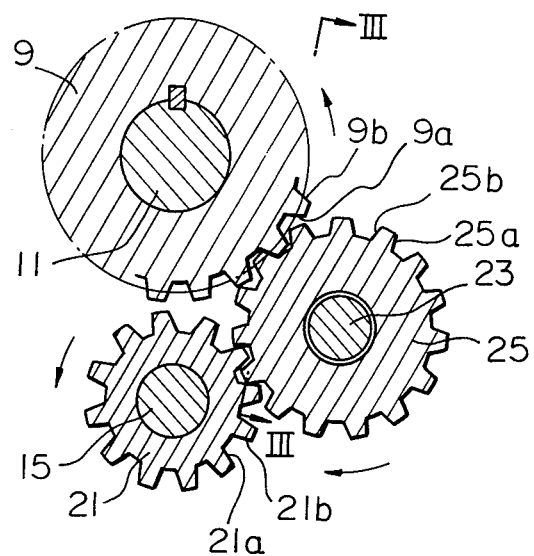
FIG. 1 is a cross sectional view of a main part of the meshing gears in a typical transmission of a motor vehicle.
Figure 2:
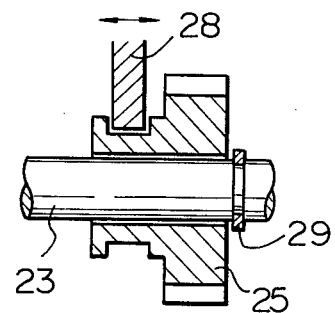
FIG. 2 is a longitudinal sectional view of the reverse idler gear shown in FIG. 1.

It can be understood that a better technical effect can be expected from the embodiment shown in FIG. 8, in comparison with the embodiment in FIG. 7, because the reverse idler gear is positively subject to an axial force in a direction opposite to a direction in which the reverse idler gear tends to be displaced. The movement of the reverse idler gear 25 in the opposite direction (i.e. the righthand direction in FIG. 3) is limited by a stop 29 (FIG. 2) secured to the idler shaft 23. It should be noted that $\beta = \beta'$ is not always necessary. Furthermore, the tapered angles $\gamma'$ and $\alpha'$ (FIG. 5) of the tooth surfaces 9b of the reverse gear 9 and of the tooth surfaces 21b of the counter reverse gear 21 have no direct relation to the present invention and, accordingly, can be optionally selected.

As can be understood from the above discussion, by the provision of tapered angles $\beta$ and $\alpha$ of the tooth surfaces of the reverse idler gear and of the counter reverse gear meshing with each other in such a way that $\beta$ is larger than $\alpha$ ($\beta > \alpha$), the reverse idler gear can be prevented from disengaging from the meshed position with the counter reverse gear.

We claim:

1. A transmission which comprises a reverse gear secured to a main shaft, a counter reverse gear secured to a counter shaft, and an axially movable reverse idler gear on an idler shaft parallel to the main shaft and to the counter shaft, said reverse idler gear being arranged between the reverse gear and the counter gear so as to mesh with them so that the connection between the reverse gear and the counter gear can be selectively established and broken by the axial movement of the reverse idler gear, the reverse idler gear comprises a toothed surface corresponding to the counter reverse gear, with a tapered tooth trace having a predetermined tapered angle $\beta$ which is larger than a predetermined tapered angle $\alpha$ of a tapered tooth trace on the toothed surface of the counter reverse gear that comes into contact with the reverse idler gear; and said reverse idler gear comprising a toothed surface corresponding to the reverse gear, with a tapered tooth trace having a predetermined tapered angle $\beta'$ which is not less than a predetermined tapered angle $\gamma$ of a tapered tooth trace on the toothed surface of the reverse gear which comes into contact with the reverse idler gear.

2. A transmission with comprises a reverse gear secured to a main shaft, a counter reverse gear secured to a counter shaft, and an axially movable reverse idler gear on an idler shaft parallel to the main shaft and to the counter shaft, said reverse idler gear being arranged between the reverse gear and the counter gear so as to mesh with them so that the connection between the reverse gear and the counter gear can be selectively established and broken by the axial movement of the reverse idler gear, the reverse idler gear comprising a toothed surface corresponding to the counter reverse gear, with a tapered tooth trace having a predetermined tapered angle $\beta$ which is larger than a predetermined tapered angle $\alpha$ of a tapered tooth trace on the toothed surface of the counter reverse gear that comes into contact with the reverse idler gear, and a toothed surface corresponding to the reverse gear, with a tapered tooth trace having an angle $\beta'$ which is smaller than a tapered angle $\gamma$ of a tapered tooth trace on the toothed surface of the reverse gear that comes into contact with the reverse idler gear.

* * * * *